3,262,969
PRODUCTION OF MONO- AND DI-ESTERS OF GLYCOLS BY OXIDATION OF OLEFINS WITH A PALLADOUS SALT IN PRESENCE OF A CARBOXYLIC ACID, A REDOX SYSTEM, AN ALKALI METAL HALIDE, CARBOXYLATE IONS AND MOLECULAR OXYGEN
Duncan Clark and Percy Hayden, Norton-on-Tees, England, assignors to Imperial Chemical Industries Limited, London, England, a corporation of Great Britain
No Drawing. Filed Feb. 18, 1963, Ser. No. 259,389
Claims priority, application Great Britain, Feb. 22, 1962, 6,945/62
10 Claims. (Cl. 260—497)

This invention relates to the production of esters, particularly di-esters of glycols.

In the complete specification based on our co-pending U.S. application Serial No. 139,836, filed September 22, 1961, there is described and claimed a process for the oxidation of ethylene to vinyl acetate by contacting ethylene with acetic acid, an ionised acetate and a palladium salt, the reaction being carried out in the presence of a redox system and of molecular oxygen. In a process of this type, some saturated esters, namely ethylidene di-acetate and sometimes small amounts of mono- and di-acetates of ethylene glycol are formed.

We have now found whereby the proportion of mono-esters and di-esters of glycols obtained in processes of this type may be substantially increased.

Thus, according to the present invention, there is provided a process for the oxidation of olefinic hydrocarbons having at least one hydrogen atom attached to one of the carbon atoms forming part of the double bond to an ester-containing product having a total content of mono-esters and di-esters of glycols of at least 30 molar percent based on the total amount of organic compounds produced, which comprises the step of contacting an olefinic hydrocarbon at a partial pressure of at most 10 atmospheres with a solution containing a carboxylic acid, an ionised carboxylate and a palladous salt, the reaction being carried out in the presence of a redox system, molecular oxygen, less than 15% by weight of water and an alkali metal halide so that, assuming complete ionisation, the halide:palladous gram-ion ratio is greater than 6:1 and the halide:carboxylate gram-ion ratio is at least 6:10.

The preferred palladium salt for use in the process of the present invention is palladous chloride, while the preferred alkali metal halide is lithium chloride. However, if desired, it is possible to use bromides instead of chlorides. The palladium catalyst may be obtained by adding metallic palladium to the reaction mixture. In this way, palladous halide is formed in situ. It will be understood that by operating in this manner a period of time elapses before the reaction velocity attains its maximum value.

Suitable olefinic hydrocarbons for use in the present process include ethylene, higher alpha-olefinic hydrocarbons containing up to 20 or more carbon atoms such as propylene, butene-1 and octene-1, aryl-substituted alpha-olefinic hydrocarbons such as styrene and alpha-methyl styrene, and olefinic hydrocarbons in which the double bond is situated in a non-terminal position such as butene-2, octene-2 and 3:5-dimethyl hexene-2, and olefinic hydrocarbons of this type containing aryl substituents.

When the olefinic hydrocarbon employed is ethylene and acetic acid and an ionised acetate are present, the saturated esters produced are ethylidene di-acetate and mono- and di-acetates of ethylene glycol. When propylene is used in place of ethylene, the saturated esters which may be produced are di-acetates of propane-1:1-diol and mono- and di-acetates of propane-1:2-diol and propane-1:3-diol. Again, when the starting material is butene-1, the saturated esters which may be produced in the presence of acetic acid and acetate ions are di-acetates of butane-1:1-diol and mono- and di-acetates of butane diols in which the hydroxyl groups are on different carbon atoms, namely butane-1:2-, -1:3-, -1:4- and -2:3-diols. An increase in the halide:carboxylate gram-ion ratio above 6:10 increases the proportion of esters of those diols in which the hydroxyl groups are attached to different carbon atoms.

In order to ensure adequate reaction rates, it is desirable for the halide concentration in the reaction mixture to be at least 0.2 molar.

The redox system employed in the present process may be organic or inorganic in nature. For example, if it is preferred to use an organic redox system, para-benzoquinone, duroquinone and 2-ethyl anthraquinone are suitable. If, on the other hand, it is preferred to use an inorganic system, cupric salts are particularly suitable. Furthermore, an inorganic system such as cupric chloride has the advantage that it provides chloride ions to the reaction system. Other inorganic redox systems such as ferric salts, particularly ferric chloride, may be used. Here again ferric chloride has the advantage of augmenting the chloride ion concentration. It is also possible to use organic and inorganic redox systems in conjunction. For instance, one of the quinones named above and cupric chloride may be used conjointly. As another possibility, two inorganic redox systems may be used together, for example, cupric chloride and ferric chloride, copper acetate and manganese acetate, ferric chloride and manganese chloride and also copper acetate and cobalt acetate.

The carboxylic acid employed should correspond to the esters which it is desired to produce. Thus, in the production of acetates, acetic acid should be present. It is also desirable for the ionised carboxylate to correspond to the ester which it is desired to produce. As the ionised carboxylates which may be employed, those derived from the alkali metals are most suitable. It is preferred to employ sodium, potassium and lithium carboxylates in the present invention. In place of or in addition to these it is also possible to use carboxylates of magnesium, calcium, zinc, cadmium or barium, but these are less suitable. The ionised carboxylate may be produced in situ. For instance, if the reaction mixture contains acetic acid and lithium chloride is present, these react together to produce lithium acetate in situ. This reaction proceeds according to the equation:

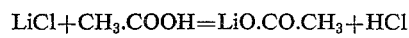
$$LiCl + CH_3.COOH = LiO.CO.CH_3 + HCl$$

the hydrochloric acid being to some extent removed in the gas stream and being also removed by reaction with the olefinic hydrocarbon to give one or more alkyl chlorides. The ionised carboxylates may also be produced in situ by adding the corresponding metal carbonate to the reaction mixture already containing a carboxylic acid.

A wide range of carboxylic acids and carboxylates may be used in the present process. These include lower aliphatic monocarboxylic acids such as acetic acid and propionic acid; higher acids such as n-hexanoic acid; aliphatic dicarboxylic acids such as adipic acid; aromatic monocarboxylic acids such as benzoic acid, and aromatic dicarboxylic acids such as terephthalic acid.

Oxygen may be introduced into the reaction mixture as a stream of the substantially pure gas. Alternatively, it may be introduced as air or as a mixture of oxygen with an inert gas such as nitrogen or in the form of an oxygen-olefinic hydrocarbon or an air-olefinic hydrocarbon mixture, provided that the olefinic hydrocarbon employed is sufficiently volatile.

The present process is suitably operated at a temperature in the range of 50° to 160° C. As already stated, when ethylene is employed, the partial pressure of this must not exceed 10 atmospheres, and preferably its partial pressure lies in the range of 0.1 to 5 atmospheres. The ratio of molecular oxygen to ethylene can be varied over a wide range, but if it is desired to operate outside explosive limits, the percentage of oxygen in the oxygen-ethylene mixture depends on the total pressure of operation. Thus, if this total pressure is atmospheric, the oxygen-ethylene mixture may contain up to 17.5% by volume of oxygen, but if the total pressure is 10 atmospheres the oxygen content should not exceed 7.0%. As previously stipulated, with olefinic hydrocarbons other than ethylene, the olefinic partial pressure must not exceed 10 atmospheres and it is preferably greater than 0.1 atmosphere.

Also, as previously stipulated, the water content of the reaction mixture must not exceed 15% by weight. The permissible water content is pressure-dependent and, at an overall operating pressure in the region of atmospheric, the amount must not exceed 7% by weight, otherwise, the quantity of mono- and di-esters of glycols will fall below the stipulated 30%.

The products of the present invention have many uses. Mono-esters and di-esters of glycols may be hydrolyzed to free glycols, and in consequence the present invention provides a method whereby olefinic hydrocarbons may be converted to glycols with the same number of carbon atoms.

*Example 1*

A solution was made up as follows:

| | Mole |
|---|---|
| Palladous chloride, 3.52 grams | $2 \times 10^{-2}$ |
| Lithium chloride, 8.5 grams | $2 \times 10^{-1}$ |
| Lithium acetate, 5.03 grams | $8 \times 10^{-2}$ |
| Cupric acetate, 7.20 grams | $3 \times 10^{-2}$ |
| Acetic acid, 200 ml. | |

This solution was raised to a temperature of 104° C. and a gas mixture comprising by volume 30% of ethylene and 70% of oxygen was passed through it at a rate of 10 liters per hour for 10¾ hours. The materials removed by vaporization were substantially completely condensed and there was no recycle to the reaction zone. In this way, the water content of the reaction mixture was maintained at a low level. An analysis of the reaction product showed that the following compounds were present:

| | Mole |
|---|---|
| Acetaldehyde | $9.2 \times 10^{-2}$ |
| Ethylidene di-acetate | $16.3 \times 10^{-2}$ |
| Di-acetate of ethylene glycol | $13.7 \times 10^{-2}$ |

In this example, the quantity of mono-acetate of ethylene glycol formed was not measured.

*Example 2*

A solution was made up as follows:

| | Mole |
|---|---|
| Palladous chloride, 1.06 grams | $6 \times 10^{-3}$ |
| Lithium chloride, 8.5 grams | $2 \times 10^{-1}$ |
| Lithium acetate 6.59 grams | $1 \times 10^{-1}$ |
| Cupric chloride, 4.04 grams | $3 \times 10^{-2}$ |
| Acetic acid, 200 mls. | |

The solution was raised to a temperature of 104° C. and a gas mixture having the volume composition of 30% ethylene and 70% oxygen was passed through it at a rate of 10 liters per hour for 41 hours. Materials removed by vaporization were substantially completely condensed and there was no recycle to the reaction zone. In this way, the water content of the reaction mixture was maintained at a low level. The analysis of the reaction product was as follows:

| | Mole |
|---|---|
| Vinyl acetate | $3.75 \times 10^{-2}$ |
| Acetaldehyde | $2.76 \times 10^{-2}$ |
| Paraldehyde | $7.89 \times 10^{-2}$ |
| Ethylidene di-acetate | $6.45 \times 10^{-2}$ |
| Di-acetate of ethylene glycol | $40.30 \times 10^{-2}$ |

In this example, the total yield of organic compounds is $61.15 \times 10^{-2}$ mole. Of this amount, the molar percentage of the di-acetate of ethylene glycol is 66, while the molar percentage of ethylidene di-acetate is only 10.5.

*Example 3*

Solutions were made up in acetic acid (200 ml.) as follows, the amounts being given as molar concentrations.

| | A | B | C | D | E |
|---|---|---|---|---|---|
| Palladous chloride | 0.03 | 0.03 | 0.03 | 0.03 | 0.03 |
| Lithium chloride | 1.03 | 1.03 | 2.03 | 2.03 | 2.03 |
| Lithium acetate | 0.5 | 0.5 | 0.5 | 0.25 | 0 |
| Cupric chloride | 0.15 | 0.15 | 0.15 | 0.15 | 0.15 |

These solutions were raised to a temperature of 105° C. and a gas mixture comprising by volume 30% of ethylene and 70% of oxygen was passed through it at a rate of 10 liters per hour. The gas mixture emerging from the reactor was passed through a water-cooled reflux condenser, by means of which acetic acid was returned to the reaction zone, and more volatile organic products were removed from the residual gas mixture by means of catch-pots cooled by solid carbon dioxide.

In the table below, the reaction times, water contents, quantities of products (expressed as moles × 100) and product output (expressed as moles per liter per hour) are given.

| Solution | Time (hrs.) | Water content (percent by weight) | Moles of Products×100 | | | | Total Rate |
|---|---|---|---|---|---|---|---|
| | | | Acetaldehyde | Ethylidene di-acetate | Diacetoxyethane | Ethylene glycol monoacetate | |
| A | 23 | 1.2 | 1.6 | 2.03 | 23.7 | 6.8 | 0.07 |
| B | 65 | 4.5 | 60.0 | 1.15 | 21.9 | 15.3 | 0.07 |
| C | 33 | 1.4 | 0.9 | 0 | 24.8 | 6.3 | 0.05 |
| D | 67 | 2.7 | 6.5 | 0 | 37.1 | 21.4 | 0.05 |
| E | 41 | 1.4 | 1.3 | 0 | 54.4 | 24.0 | 0.10 |

In this example, no vinyl acetate was detected in any of the runs.

In the various runs, the percentage yields of acetaldehyde and esters were as follows:

| Solution | Percentage Yields | | | |
|---|---|---|---|---|
| | Acetaldehyde | Ethylidene di-acetate | Diacetoxyethane | Ethylene glycol monoacetate |
| A | 4.7 | 5.9 | 69.5 | 19.9 |
| B | 61.0 | 1.2 | 22.3 | 15.5 |
| C | 2.8 | 0 | 77.5 | 19.7 |
| D | 12.0 | 0 | 57.1 | 30.9 |
| E | 1.6 | 0 | 68.2 | 30.2 |

*Example 4*

Four solutions were made up, each containing acetic acid (200 ml.) palladous chloride (molar concentration 0.05) and cupric acetate (molar concentration 0.35). These solutions contained lithium chloride and lithium acetate as follows:

| Solution | Lithium Chloride Molar Concentration | Lithium Acetate Molar Concentration |
|---|---|---|
| A | 1.0 | 0.5 |
| B |  | 0.5 |
| C | 2.0 | 1.0 |
| D | 2.0 | 0.25 |

These solutions were raised to a temperature of 100° C. and a gas mixture comprising by volume 50% of ethylene and 50% of oxygen was passed through at a rate of 20 liters per hour, the reaction being carried out as described in Example 3.

The results of the reactions are summarized in the following table:

| Solution | Time (hrs.) | Moles of Product×100 | | | | Total Rate ×10$^2$ |
|---|---|---|---|---|---|---|
| | | Acetaldehyde | Ethylidene diacetate | Diacetoxyethane | Glycol monoacetate | |
| A | 5 | 8.2 | 18.5 | 9.4 | 9.0 | 45 |
| B | 17 | 15.8 | 6.9 | 16.4 | 14.7 | 15.8 |
| C | 5 | 2.4 | 3.4 | 10.6 | 11.2 | 27.6 |
| D | 16.3 | 11.7 | 5.3 | 28 | 49 | 28.8 |

In this example, no vinyl acetate appeared to be formed. From the figures presented above, the following percentage yields of products based on the total quantity of acetaldehyde and esters produced, were calculated:

| Solution | Acetaldehyde | Ethylidene diacetate | Diacetoxyethane | Glycol monoacetate |
|---|---|---|---|---|
| A | 18 | 41 | 21 | 20 |
| B | 29 | 13 | 31 | 27 |
| C | 9 | 12 | 38 | 41 |
| D | 12 | 6 | 30 | 52 |

These results show (see solution A) that with a chloride:acetate molar ratio of about 1:1, equal percentage yields of ethylidene diacetate and acetates of ethylene glycol are obtained. On raising the proportion of chloride, increased proportions of acetates of ethylene glycol are obtained.

*Example 5*

Solutions were made up in acetic acid (200 ml.) as follows, the amounts being given as molar concentrations:

| Solution | Palladous Chloride | Lithium Chloride | Lithium Acetate | Cupric Chloride |
|---|---|---|---|---|
| A | 0.03 | 1.03 | 0.5 | 0.15 |
| B | 0.03 | 2.03 | 0 | 0.15 |
| C | 0.03 | 1.03 | 0 | 0.15 |

These solutions were raised to a temperature of 105° C. and a mixture comprising 30% propylene and 70% oxygen was passed through at a rate of 10 liters per hour, the pressure being atmospheric and the reaction being carried out as described in Example 3. The products were analyzed and the results are given below, the quantities being expressed as moles×100.

| Solution | Reaction time, hrs. | Acetone | Propene-esters | 1:1 DAP | 1:2 DAP | 1:3 DAP | 1-OH 2-AP | 1-A 2-OH P |
|---|---|---|---|---|---|---|---|---|
| A | 50 | 12.0 | 2.0 | 1.8 | 28 | 0.4 | 9 | 1 |
| B | 65 | 3.5 | 1.0 | 0.9 | 26 | 0 | 9 | 3 |
| C | 24 | 9.0 | 1.0 | 0 | 22 | 0 | 6 | 1 |

In this table, DAP=di-acetoxy propane, 1-OH 2-AP=1-hydroxy 2-acetoxy propane and 1-A 2-OH P=1-acetoxy 2-hydroxy propane. In the three runs A, B and C, the total rates of output of organic compounds given in the table above, expressed as moles per liter per hour of reaction-filled space, were 0.05, 0.03 and 0.08 respectively.

The percentage yields of the organic compounds obtained above are given in the table below:

| Solution | Acetone | 1:1 DAP | 1:2 DAP | 1:3 DAP | Total hydroxy acetoxy propanes | Propene Esters |
|---|---|---|---|---|---|---|
| A | 22 | 3 | 52 | 1 | 18 | 4 |
| B | 8 | 2 | 60 | 0 | 28 | 2 |
| C | 23 | 0 | 56 | 0 | 19 | 2 |

From this table, it will be seen that the reaction proceeds even in the absence of an added alkali metal acetate, indicating that an ionized carboxylate is formed in situ.

*Example 6*

A solution was made up in propionic acid (200 ml.) which contained the following molar concentrations: palladous chloride 0.03; lithium chloride 2.03; cupric chloride 0.15. This solution was raised to a temperature of 105° C. at atmospheric pressure and a mixture comprising 30% of ethylene and 70% oxygen was passed through for 67 hours at a rate of 10 liters per hour. From the final reaction mixture the following compounds were isolated, the quantities being given in moles×100.

Acetaldehyde _____ 10
Ethylidene dipropionate _____ 2
Dipropioxyethane _____ 65
Ethylene glycol monopropionate _____ 30

Of these organic products formed, it will be seen that 89% consisted of esters of ethylene glycol. The total rate of production of organic compounds was 0.08 mole per liter of reaction-filled space per hour.

*Example 7*

Two solutions (A and B) were made up in acetic acid (1.5 liters) as follows the quantities being molar concentrations:

|  | A | B |
|---|---|---|
| Palladous chloride | 0.04 | 0.04 |
| Lithium chloride | 0.08 | 2.0 |
| Lithium acetate | 1.0 | 0.2 |
| Cupric chloride | 0 | 0.3 |
| Cupric acetate | 0.45 | 0 |

These solutions were reacted at a temperature of 100° C. and a pressure of 95 lbs. per square inch gauge with a gas mixture comprising propylene (300 liters per hour) and oxygen (30 liters per hour). The duration of reaction A was 5.5 hours while that of reaction B was 4.0 hours. On analysis, the reaction products were found to contain the following compounds, the quantities being in moles × 100.

|  | A | B |
|---|---|---|
| Acetone | 17.9 | 17.7 |
| Isopropenyl acetate | 19.4 | 1.5 |
| n-Propenyl acetate | 21.0 | 0.6 |
| Allyl acetate | 5.9 | 2.5 |
| 1:1 diacetoxypropane | 0 | 21 |
| 1:2 diacetoxypropane | 2.0 | 16 |
| 1:3 diacetoxypropane | 0 | 9 |
| 1-hydroxy 2-acetoxypropane | 0 | 22 |

The total rates of production of the organic compounds listed in reactions A and B, expressed as moles per liter of reaction-filled space per hour, were 0.08 and 0.13 respectively. The percentage yields of the organic compounds in the two runs are given in the table below.

|  | A | B |
|---|---|---|
| Acetone | 27.1 | 19.4 |
| Isopropenylacetate | 29.2 | 1.6 |
| n-Propenylacetate | 31.8 | 0.7 |
| Allyl acetate | 8.9 | 2.7 |
| 1:1 diacetoxypropane | 0 | 22.9 |
| 1:2 diacetoxypropane | 3.1 | 17.7 |
| 1:3 diacetoxypropane | 0 | 10.3 |
| 1-hydroxy 2-acetoxypropane | 0 | 24.9 |

In run A the chloride:acetate molar ratio was less than than 1:10. It will be seen that the formation of saturated esters was very low. On the other hand, in run B, the chloride:acetate ratio was high, namely greater than 13:1, and the product contained 75.8% of saturated mono- and di-esters.

*Example 8*

Two solutions (A and B) were made up in acetic acid (200 ml.) as follows, the quantities being molar concentrations:

|  | A | B |
|---|---|---|
| Palladous chloride | 0.1 | 0.05 |
| Lithium chloride | 0.2 | 1.0 |
| Lithium acetate | 0.4 | 0.4 |
| Cupric acetate | 0.2 | 0 |
| Cupric chloride | 0 | 0.2 |

These solutions were raised at atmospheric pressure to a temperature of 120° C. and a gas mixture comprising equal volumes of oxygen and butene-2 was passed through at a rate of 10 liters per hour for 4 hours. On analysis, A gave 1.0 gram of butene esters, and 0.09 gram of butane di-esters. The corresponding results for B were 0.13 and 0.33 gram respectively.

We claim:
1. A process for the oxidation of olefinic hydrocarbons having at least one hydrogen atom attached to one of the carbon atoms forming part of the double bond to an ester-containing product having a total content of mono-esters and di-esters of glycols of at least 30 molar percent based on the total amount of organic compounds produced, which comprises the step of contacting at a temperature of 50° to 160° C. the olefinic hydrocarbon at a partial pressure of at most 10 atmospheres with the solution containing a carboxylic acid selected from the group consisting of aliphatic and aromatic monocarboxylic acids, carboxylate ions additional to those derived from the carboxylic acid and a palladous salt, the reaction being carried out in the presence of a redox system, molecular oxygen, less than 15% by weight of water and an alkali metal halide so that, assuming complete ionisation, the halide:palladous gram-ion ratio is greater than 6:1 and the halide:total carboxylate gram-ion ratio is at least 6:10.

2. A process as claimed in claim 1 in which the olefinic hydrocarbon is selected from the group consisting of ethylene, propylene, higher alpha-olefinic hydrocarbons containing up to 20 carbon atoms, aryl-substituted alpha-olefinic hydrocarbons, olefinic hydrocarbons in which the double bond is situated in a non-terminal position and olefinic hydrocarbons in which the double bond is situated in a non-terminal position containing an aryl substituent.

3. A process as claimed in claim 1 in which the carboxylate ions are derived from the carboxylate of an alkali metal selected from the group consisting of lithium, sodium and potassium.

4. A process for the oxidation of ethylene to an ester-containing product having a total content of mono-esters and di-esters of ethylene glycol of at least 30 molar percent based on the total amount of organic compounds produced, which comprises the step of contacting at a temperature of 50° to 160° C. ethylene at a partial pressure in the range of 0.1 to 5 atmospheres with a solution containing a carboxylic acid selected from the group consisting of aliphatic and aromatic monocarboxylic acids, carboxylate ions additional to those derived from the carboxylic acid and a palladous salt, the reaction being carried out in the presence of a redox system, molecular oxygen, less than 15% by weight of water and an alkali metal halide, so that, assuming complete ionization, the halide:palladous gram-ion ratio is greater than 6:1 and the halide:total carboxylate gram-ion ratio is at least 6:10.

5. A process as claimed in claim 4 wherein the carboxylic acid is acetic acid; the carboxylate ions are derived from lithium acetate; the palladous salt is palladous chloride; the redox system is cupric chloride; the alkali metal halide is lithium chloride; and the halide concentration is at least 0.2 molar, the principal products including ethylidene di-acetate and acetate of ethylene glycol.

6. A process as claimed in claim 1 in which the overall operating pressure is atmospheric and the amount of water is at most 7% by weight.

7. A process as claimed in claim 1 in which the palladium salt is palladous chloride and the alkali metal halide is lithium chloride.

8. A process as claimed in claim 1 in which the halide concentration in the reaction mixture is at least 0.2 molar.

9. A process as claimed in claim 1 in which the redox system is a salt of a metal of variable valency selected from the group consisting of copper, iron, manganese and cobalt.

10. A process as claimed in claim 1 in which the redox system comprises a quinone selected from the group consisting of parabenzoquinone, duroquinone and 2-ethyl anthraquinone.

(References on following page)

References Cited by the Examiner

UNITED STATES PATENTS

| | | | |
|---|---|---|---|
| 2,497,408 | 2/1950 | Gresham | 260—497 |
| 2,519,754 | 8/1950 | Gresham | 260—497 |
| 2,701,813 | 2/1955 | Snyder | 260—497 |
| 3,076,032 | 1/1963 | Riemenschneider et al. | 260—597 |

FOREIGN PATENTS 137,511   4/1960   U.S.S.R.

OTHER REFERENCES

Moiseeve: Proceedings of the Academy of Sciences, U.S.S.R., vol. 133, pp. 801–804 (July 1960).

Moiseeve: Proc. Acad. Sci., U.S.S.R. Physical Chemistry, 1960, p. 116.

Smidt: Chemistry and Industry, Jan. 13, 1962, pp. 54–61.

Smidt: Agnew. Chim., vol. 71, 1959, pp. 176–182.

LORRAINE A. WEINBERGER, *Primary Examiner.*

LEON ZITVER, D. P. CLARKE, B. M. EISEN, V. GARNER, *Assistant Examiners.*